(12) United States Patent
Abbas et al.

(10) Patent No.: US 7,159,834 B1
(45) Date of Patent: Jan. 9, 2007

(54) STRESS RELEASE MOLD FOR THERMAL SETTING COMPOSITIONS AND SYSTEMS THEREOF

(75) Inventors: Syed Husain Abbas, Seymour, CT (US); David John Lang, Southbury, CT (US)

(73) Assignee: Conopco, Inc., Englewood Cliffs, NJ (US)

( * ) Notice: Subject to any disclaimer, the term of this patent is extended or adjusted under 35 U.S.C. 154(b) by 34 days.

(21) Appl. No.: 11/172,532

(22) Filed: Jun. 30, 2005

(51) Int. Cl.
*B29C 33/50* (2006.01)
*B29C 39/36* (2006.01)

(52) U.S. Cl. .................. 249/66.1; 249/134; 425/440; 510/120; 510/140

(58) Field of Classification Search .............. 425/440, 425/DIG. 22, DIG. 44, 803; 249/66.1, 134; 264/313; 510/137, 140
See application file for complete search history.

(56) References Cited

U.S. PATENT DOCUMENTS

| | | | |
|---|---|---|---|
| 3,149,188 A | 9/1964 | Schmitt et al. | |
| 4,364,878 A | 12/1982 | Laliberte et al. | |
| 5,255,729 A | 10/1993 | Cook | |
| 5,615,731 A | 4/1997 | Roehrig et al. | |
| 5,669,208 A | 9/1997 | Tabaroni et al. | |
| 5,882,557 A | 3/1999 | Kazuhiro et al. | |
| 6,793,193 B1 * | 9/2004 | de Groote | 249/119 |
| 2005/0014665 A1 | 1/2005 | Nadakatti et al. | |

FOREIGN PATENT DOCUMENTS

| | | |
|---|---|---|
| EP | 0 273 769 | 7/1988 |
| EP | 0 321 179 | 6/1989 |
| EP | 0 854 092 | 7/1998 |
| FR | 910 256 | 11/1944 |
| JP | 08-099163 | 4/1994 |
| JP | 10-323340 | 12/1997 |
| JP | 10-291230 | 11/1998 |
| WO | 94/08852 | 4/1994 |
| WO | 98/51773 | 11/1998 |

OTHER PUBLICATIONS

Patent Abstracts of Japan—abstract of JP 10-291230—dated Feb. 8, 2005—1 page.
Patent Abstracts of Japan—abstract of JP 10-323340—dated Feb. 8, 2005—1 page.
Patent Abstracts of Japan—abstract of JP 08-099163—dated Feb. 8, 2005—1 page.

* cited by examiner

*Primary Examiner*—Donald Heckenberg
(74) *Attorney, Agent, or Firm*—Michael P. Aronson (57) ABSTRACT

A stress-release mold is described for casting thermosetting compositions especially compositions designed for consumer use. At least one wall of the mold includes a stress-releasing-element characterized by having a more flexible region or regions than the remaining wall or walls of the mold and wherein the stress-releasing-element includes a region of lower curvature at least partially surrounded by a region of higher curvature. The stress-release mold greatly reduces or eliminates surface defects caused by shrinkage of thermosetting compositions as they cools. A system is also described that includes the inventive mold containing a thermosetting composition wherein the mold also serves as all or part of the package for the composition.

24 Claims, 6 Drawing Sheets

STRESS RELEASE MOLD FOR THERMAL SETTING COMPOSITIONS AND SYSTEMS THEREOF

FIELD OF THE INVENTION

The present invention relates to molds for forming thermal setting compositions especially aqueous based compositions used for personal care. More specifically the molds provide a means of releasing stresses built up within the composition as it cools. The molds can also serve as part or all of the packaging for the thermal setting compositions.

BACKGROUND

Many multi-component compositions that are solid are made by extrusion. For example, the majority of soap and detergent bars consumed worldwide are produced by extrusion. Extrusion requires a thermoplastic mass that can tolerate extensive shear. However, an alternative process is required to produce compositions whose structure, geometric properties and constituents are shear sensitive. The most commonly employed method for shaping shear sensitive solids is casting.

Casting involves transfer of the composition in the molten state into some form of mold and the subsequent solidification of this mixture by quiescent cooling, i.e., cooling without mixing. The transfer can be by simple pouring under gravity or by injection under pressure. The molten mixture can range from a simple Newtonion liquid to a viscoelastic paste.

One problem that occurs when using individual molds that are filled substantially to capacity (so called "capacity molds") for casting thermal setting compositions is the development of imperfections due to shrinkage during cooling. When the mold is made of relatively easily deformable materials such as plastic film, the most common imperfections produced by thermal shrinkage are dents, wrinkles, and air cavities within the interior of the product. This is a particular problem when the mold also serves as all or a part of the packaging for such compositions at the point of sale where appearance is a key indicator of product quality.

In contrast, when the mold is made of rigid walls, holes or occlusion can occur within the mass that are often only evident in use or if the solid is cut. The problems caused by thermal shrinkage are particularly severe when the temperature of the molten composition is high, or when the composition includes multiple phases that have a high coefficient of thermal expansion, e.g., a composition such as an aerated bar that contains a dispersed gas. Aeration exacerbates the shrinkage of all formulations and causes the development of pronounced defects that are easily seen by the consumer.

One approach that has been suggested to overcome the problem of shrinkage of thermal setting soap or detergent compositions during cooling involves transferring the molten mass into an essentially elastic polymer casing which can accommodate the shrinkage. However, since such casings are less than 100 microns in thickness, either only very simple shapes are possible or an external shaping device or mold is required for more sophisticated shapes. Furthermore, because of its elastic nature and thinness, such "sausage casing" films are not very robust and additional packaging is usually required.

A similar problem of defects produced by thermal shrinkage is also frequently encountered in the molding of plastics, e.g., molding of thermosets into capacity molds. Three main approaches have been employed in the polymer industry to overcome these problems: reduction in the coefficient of thermal expansion via formulation; development of very complex molds that can adjust volume or pressure in response to thermal shrinkage; and inclusion of a gas "buffer" at the mold wall that takes up the shrinkage. All of these approaches, however, require complex molds and are not suitable for application when the mold also serves as part or all of the packaging for the composition at the point of sales.

The following publications form a part of the related art:

U.S. Patent Publication 2005/0014665 to Nadakatti et al published Jan. 20, 2005 describes a continuous process for casting employing a continuous tube of flexible material. The tube acts as a sleeve. The composition is shaped in or on a suitable mold.

EP 0321179 to Instone et al published Jun. 21, 1989 describes a method of casting soap into a pack made out of flexible film. The pack has the form of a bag or sachet. Other shapes required a shaping means such as platens.

WO98/51773 to Nadakatti et al published Nov. 19, 1998 describes a split cavity casting mold including at least two rigid complimentary dies which upon engagement defines a cavity corresponding to a desired shape of the cast article.

U.S. Pat. No. 3,149,188 to Schmitt issued on Sep. 15, 1964 describes a method of manufacturing a ready-to-use cake of transparent soap. The method includes the steps of casting a liquid mass into transparent plastic mold, permitting the liquid mass to cool and maintaining the composition in the sealed mold until ready to use.

Fr 910,256 to Lonchambon published Nov. 10, 1944 describes a method of casting liquid soap into a preformed mold that is retained as an envelope around the soap and thus delivered to the consumer.

EP 0854092 to Tabaroni et al published Jul. 22, 1998 describes a container made from a thermoformable and heat sealable material including a pair of thermoformed halves heat sealed along an edge so as to create a stiffening rib. The halves are obtained by folding a single sheet folded along its lower edge.

WO 94/08852 to Tabaroni et al describes a container made of a thermoformable and heat sealable material, its method of manufacture and an apparatus for carrying out this method.

U.S. Pat. No. 5,669,208 to Tabaroni et al issued Sep. 23, 1997 describes a container formed in a thermoformable and heat weldable material including an inlet having an inlet wall portions which are elastic so that the inlet is self closing prior to permanent sealing. A system including blow molding and filling stations is also described.

JP 10-291230 to Kazuharu published Nov. 4, 1998 describes a method for injection molding of resins utilizing gas to prevent surface defects.

JP 10-323340 to Yoshimitsu published Dec. 12, 1997 discloses a mold for injection molding of plastic that is linked to a hydraulic cylinder which serves to pressurize the contents of the mold thereby eliminating defects caused by shrinkage during cooling.

JP 08-099163 to Mitsuhiro et al published Apr. 16, 1994 describes a method and mold for casting metal that includes pressurized pins to adjust volume within the mold during cooling and solidification.

U.S. Pat. No. 5,615,731 to Roehrig et al issued on Apr. 1, 1997 describes a ridged mold for casting parts having an I-shaped cross-section. The mold includes flange or bulges shaped in a particular way that forces shrinkage in a preferred direction.

U.S. Pat. No. 5,882,557 to Kazuhiro et al issued Mar. 16, 1999 described a mold with members made of a silicone rubber for fabricating an ultrasonic coupler made from an aqueous solution of polyvinyl alcohol.

U.S. Pat. No. 5,255,729 to Cook et al issued Oct. 26, 1993 describes a process for forming net shaped parts which includes the step of heating the mold and contents such that their coefficients of thermal expansion are matched thereby eliminating shrinkage.

EP 0273769 to Stone et al published Jul. 6, 1988 describes an injection molding apparatus that employs a hydraulic system to pressure mold and compensate for shrinkage during cooling.

U.S. Pat. No. 4,364,878 to Laliberto describes a mold for fabricating lenses that has movable mold inserts ("walls") that are used to compensate for shrinkage.

The present invention seeks improvements over deficiencies in the known art. Among the one or more problems addressed include the development of a capacity mold for thermal setting compositions that eliminates stress induced defects from thermal shrinkage of the composition during cooling.

SUMMARY OF INVENTION

It has been found that the defects caused in the cooling of molded thermal setting compositions can be greatly reduced or eliminated by modifying the capacity mold in a particular way that absorb the stress in a controlled manner. Specifically, the mold for shaping thermal setting compositions comprises a cavity bounded by a wall or walls wherein at least one wall includes a stress-releasing-element having a region of lower curvature and an at least partially surrounding region of higher curvature and wherein the average flexibility, $F_{SRE(AVE)}$, of the lower curvature region and/or the surrounding higher curvature region comprising the stress-releasing-element, is greater than the average flexibility of the remaining wall or remaining walls of the mold, $F_{RW(AVE)}$.

In one embodiment of the invention, all the walls of the mold are made of the same polymer film (same chemical composition). However, the polymer film of the stress-releasing-element is thinner than the film forming the remaining walls.

In another embodiment at least two distinct geometrical regions of the stress-releasing-element are arranged concentrically and the central region (the region closest to the center of the wall) has a lower average curvature than the distal region.

In another embodiment the mold is made by a blow-molding or a thermoforming process.

Another embodiment is a system that includes a thermal setting composition that is packaged within a stress-releasing capacity mold. This capacity mold comprises a cavity bounded by a wall or walls wherein at least one wall includes a stress-releasing-element having a region of lower curvature and an at least partially surrounding region of higher curvature and wherein the average flexibility, $F_{SRE(AVE)}$, of the lower curvature region and/or the surrounding higher curvature region comprising the stress-releasing-element, is greater than the average flexibility of remaining wall or remaining walls of the mold, $F_{RW(AVE)}$.

These and other embodiments are described more fully below.

DETAILED DESCRIPTION OF INVENTION

As used herein % or wt % refers to percent by weight of an ingredient as compared to the total weight of the composition or component that is being discussed.

Except in the operating and comparative examples, or where otherwise explicitly indicated, all numbers in this description indicating amounts of material or conditions of reaction, physical properties of materials and/or use are to be understood as modified by the word "about." All amounts are by weight of the final composition, unless otherwise specified.

For the avoidance of doubt the word "comprising" is intended to mean "including" but not necessarily "consisting of" or "composed of." In other words, the listed steps, options, or alternatives need not be exhaustive.

The present invention relates to molds that are useful for casting thermal setting compositions, especially aqueous surfactant compositions, by cooling the composition until it forms a solid or an elastic gel. By the term solid is meant a composition that retains the shape of the mold when removed from the mold. This solid can be crystalline (generally polycrystalline), or amorphous. An elastic gel is defined here as a mass that has a distinct yield stess but may not retain the exact shape of the mold when removed from the mold. The elastic gel may be structured by a polymer, e.g., gelatin, one or more surfactants, e.g., a cubic phase or coagel, or by solid particles, e.g., colloidal silica, fatty acid, etc.

The invention also relates to a system including a thermal setting composition, especially an aqueous surfactant composition that is packaged within a plastic mold having the properties described herein.

The mold, relevant thermal setting compositions and various optional components are described below.

Mold

The mold of the instant invention are capable of being used as a capacity mold for casting of thermal setting compositions, especially compositions designed for consumer use. By the term "capacity mold" is meant a mold that is filled to capacity with the composition to be cast and wherein the composition is in direct contact with substantially the entire interior surface of the mold. The inventive mold is designed to absorb in a directed or controlled way stresses that are produced during cooling in such capacity molds.

The interior cavity of molds suitable for the present invention can be made to produce castings having various shapes. These shapes include geometrical forms, figures, and symmetrical and nonsymmetrical abstract forms. Geometrical forms include but are not limited to parallelepipeds, rhomboids, oblate and prolate spheroids, spheres, cylinders with rounded ends, torrroid, and combinations of these geometric forms and the like. Figures may include animals, iconic characters (e.g., cartoon characters) and common objects.

Preferred forms are those suitable for personal washing bars, e.g., toilet soap, based on their haptic and ergonomic properties.

The molds of the invention can be used to make articles of various sizes. For skin cleansing applications, bar shaped articles up to about 10 cm in length, about 7 cm in width and about 3–5 cm in thickness can be conveniently prepared. Other shapes may however, have different dimensions, e.g., travel size products and are within the scope of the invention.

The capacity of the instant molds, i.e., the volume of the cavity, is generally in the range from about 30 cm$^3$ to about 150 cm$^3$, preferably from about 70 cm$^3$ to about 125 cm$^3$.

The term wall is used to describe a boundary surface separating the interior and exterior of the mold. A wall can include two or more geometrically distinct regions exhibiting a sharp transition in for example, curvature, composition and/or thickness. Alternatively, the wall can be a more or less continuous entity such as a hollow sphere or the cylinder surface of a bottle. Regions that are bounded by seams and joined by heat sealing, adhesive, or pressure fits will be counted as a separate individual wall even though each individual wall may include regions having discontinuous curvatures.

The wall or walls of the mold are preferably made of plastic, especially a polymeric film that is suitable for packaging consumer products designed for cosmetic or food applications. It is desirable that this packaging film be compatible with compositions that may contain surfactants and/or solvents especially skin compatible solvents. It is also desirable that the film can be shaped into a mold by conventional hot forming processes such a blow molding or thermoforming, e.g., pressing over a heated mandrill.

The polymer film comprising the walls can be made of a single layer or a laminate of several layers. Each layer may be a homopolymer, a copolymer or a composite of polymeric and nonpolymeric materials, e.g., mineral fillers. The layer or layers can also include optional materials such as plasticizer, UV stabilizer, biocides, perfume, combinations of these materials and the like.

The thickness of polymer films used to fabricate the mold wall of the invention is generally in the range of from about 50 to about 700 microns, preferably from about 100 to about 550 microns and most preferably from about 200 to about 500 microns.

Polymers that are suitable for the type of packaging films forming the inventive mold are well known in the packaging art and include but are not limited to: polycarbonate, polyethylene terephthalate (including atactic forms) and other polyesters, polyvinyl chloride, high density polyethylene, low density polyethylene, linear low density polyethylene, polypropylene, biaxially orientated polypropylene, ethylene-vinyl alcohol copolymers, ethylene vinylacetate copolymers, polystyrene, acrylic/styrene/butadiene copolymers and blends of these polymers and copolymers formed from their constituent monomers.

Laminated films are also suitable as wall materials and in many cases provide superior properties compared with single layer films such as improved resiliencey or bending strength combined with heat sealability. Nonlimiting examples of useful laminates include: polystyrene/ethylene vinyl alcohol copolymer/polyetheylene; two or more polypropylene films laminated together with a heat sealable surface front and back; biaxially orientated polypropylene laminated to low density polyethylene with polyvinyl acetate to improve heat sealing.

Laminates of polystyrene and polyethylene are especially suitable as the wall material for the instant molds.

A key feature of the molds of the invention is the inclusion of one or more stress-releasing-elements. A "stress-releasing-element" is a wall or portion of a wall of the mold that is characterized by two properties. Firstly the stress-releasing-element includes a region or regions of greater flexibility than the remaining wall or walls of the mold. Secondly, the stress-releasing-element includes a region of lower curvature that is at least partially surrounded by a region of higher curvature after the casting of the thermal setting composition is complete, i.e., after the thermal setting composition has cooled and completely solidified in the mold. It is emphasized that the stress-releasing-element can be an entire wall of the mold or a portion of a wall.

The stress-releasing-element can be made more flexible in a variety of ways. The inventors have found two methods to be particularly suitable.

The first method of increasing flexibility is to make the stress-releasing-element or a portion of the stress-releasing-element out of a polymer film that has a different composition having greater flexibility compared with the remaining wall or walls. Ways to achieve this include: altering the type or increasing the level of plasticizer, changing the monomer ratio in films utilizing copolymer, e.g., increasing the level of low Tg monomer(s); and altering the relative ratios (e.g., mass per unit area) of the individual polymer films making up a laminated film. The latter method of modifying the laminated film without necessarily changing the chemical composition of the constituent films is convenient because it does not increase the number of chemical constituents required.

A second method of increasing flexibility is to make the stress-releasing-element or a region of the stress-releasing-element, e.g., the region of lower curvature, thinner than the remaining region, wall or walls but use a polymer film of approximately the same chemical composition for all the walls of the mold. This can be achieved by either using a thinner polymer film to construct the stress-releasing-element or by using the same polymer film for all the walls but pre-stretching the stress-releasing-element area to create thinner polymer regions prior to the final thermoforming step.

One variant of the second method is the is the creation by stretching or squeezing the film during the formation of the mold a gradient in thickness, This gradient preferably is directed towards the interior region of the of the stress-releasing-element, i.e., the interior is most flexible.

A variety of methods well known in the packaging and polymer film art can be used to measure and compare film flexibility, e.g., ASTM methods. These methods measure the force required to bend a rectangular sample of a polymer film of fixed dimensions to a defined bending angle. The lower the bending force the more flexible the film.

Three types of methods are commonly used. The Cantilever Test measures the bending (deflection) of a film of given dimensions that is fixed at one end. The degree of bending under a constant load is measured or alternatively the load required to achieve a constant deflection or degree of bending is determined. The ASTM method D747 "Apparent bending modulus of plastic by means of a cantilever beam" is one such method that can be utilized as well as variations described in the literature.

The Three Point Bending Test fixes both ends of a film of constant dimensions and determines the deflection or bending of the film in response to an applied force. The test can be carried out under constant load or constant deflection. The ASTM method D790 "Three point flexure test" can be utilized or one of the various alternatives described in the literature.

A third but less preferred method to measure film flexibility for non-curled samples, is the degree of bending of a polymer film of fixed dimension under its own weight.

Recent evidence in the literature indicates that the Cantilever Test is the most reliable of the three tests mentioned above for a variety of polymer films and laminates (Wyser Y et al "Predicting and determining the bending stiffness of thin films and laminates", Packaging Technology and Science, Volume 14(3), pp 97–108 (2001)).

The average flexibility, $F_{SRE(AVE)}$, of the lower curvature region and/or the surrounding higher curvature region included in the stress-releasing-element should be greater than the average flexibility of remaining wall or remaining walls of the mold, $F_{RW(AVE)}$.

The average flexibility of the stress-releasing-element or the higher flexibility region of the stress-releasing-element should have a flexibility as measured by its bending strength, that is at least about 20% higher than the remaining wall or walls, preferably at least about 40% higher and most preferably at least about 50% higher. The bending strength is the force required to bend a unit length of film to a specified radius. By the term "remaining wall or walls" is meant the regions and walls other than the stress-releasing-element.

By the term "X % greater" is meant that the ratio of the flexibility of the stress-releasing-element to the average flexibility of the remaining regions and walls satisfies the following inequality:

$$F_{SRE(AVE)}/F_{RW(AVE)} > 1 + X/100$$

where $F_{SRE(AVE)}$, is the average flexibility of the stress-releasing-element (or higher flexibility region within the stress-releasing-element) and $F_{RW(ave)}$ is the average flexibility of the remaining wall or walls.

Thus, the ratio of the average flexibility of the said region of the stress-releasing-element to the average flexibility of the remaining wall or walls is greater than 1.2, preferably greater than 1.4 and most preferably 1.5 or greater.

In the above discussion the term "average flexibility" is used. This term is introduced because in the fabrication of the mold by for example blow molding, some regions of any wall can become thinner while others can become thicker. Furthermore, in some cases it may be advantageous that not all the regions of the stress-releasing-element have a higher flexibility than the remaining wall or walls.

The "average flexibility" of the wall or region in question is estimated in most cases as the nominal flexibility of the plastic film used to fabricate that wall or region, e.g., the remaining walls (walls other than the one which contains the stress-releasing-element). Alternatively, in the case of extensive deformations, the average flexibility is taken as the flexibility of a polymer film having the same nominal composition and a thickness equal to the average measured thickness of the wall or region in question.

As mentioned above one suitable method of achieving the desired differential in flexibility between the stress-releasing-element and the other walls of the mold is through a reduction in the thickness of the stress-releasing-element. The bending strength of films composed of a single polymer layer, is proportional to the bending modulus multiplied by the cube of the thickness. Thus, the stress-releasing-element should be thinner (on average) than the average thickness of the remaining walls of the mold by at least about 8%, preferably at least about 16% and most preferably at least about 25%.

By the term "X % thinner" is meant that the ratio of the average thickness of the higher flexibility region or regions of the stress relieving to the average thickness of the remaining wall or walls satisfies the following inequality:

$$T_{SRE(AVE)}/T_{RW(AVE)} < 1 - X/100$$

where $T_{SRE(AVE)}$ is the thickness of the stress-releasing-element (or the higher flexibility region of the stress-releasing-element) and $T_{RW(AVE)}$ is the average thickness of the remaining wall or walls.

Thus, the ratio of the thickness of the stress-releasing-element (or the higher flexibility region of the stress-releasing-element) to the average thickness of the remaining walls should be less than about 0.92, preferably less than about 0.84, and most preferably about 0.75 or less.

The "average thickness" is taken in most cases as the nominal thickness of the plastic film used to fabricate the region in question (e.g., remaining walls or regions—other than the stress-releasing-element). Alternatively, in the case of extensive deformations, the average thickness is taken as the statistical average measured thickness, e.g., measuring the thickness with calipers at a number of locations and taking an average.

The relationship between the bending strength and film thickness is much more complicated when the polymer film is a laminate as is usually the case. As discussed by Morris and Vansant, the stiffness of laminated films depends extensively on the detailed construction of the film, especially the position of the various constituent films of the laminate. [B. A. Morris and J. D Vansant, "The influence of sealant modulus on the bending stiffness of multilayer films", 1997 TAPPI Polymers Laminations and Coating Conference, Aug. 24–28, Toronto, Ont. Canada). The inventors have found that at least about a 10–15% reduction in thickness of the stress-releasing-element relative to the other walls of the mold and preferable at least about a 20% reduction is sufficient in many cases. However, with some compositions and geometry a larger % reduction is required.

The above guidelines for flexibility and thickness differentials have been found suitable in the cases examined by the inventors. However, the exact differentials required will depend in a complex way on the details of the mold design (e.g., complexity of embossing), the extent and rate of shrinkage of the thermal setting composition, and the exact polymer film employed. Thus, for any application, the guidelines given above are useful initial estimates for wall flexibility differentials but should be confirmed by simple experiments utilizing the principles set forth herein to establish the differentials required for defect-free cast compositions and packs.

A second key feature of the stress-releasing-element of the invention is that it includes a region of lower curvature at least partially surrounded by a region of higher curvature.

The term "surrounded" is used in the accepted sense as being confined or encircled. Thus a region of lower curvature at least partially surrounded by a region of higher curvature means that the region of lower curvature is at least partially confined or encircled at its perimeter by a region of higher curvature.

In the instant invention the "curvature", C, is defined as the mean value of the two principle curvatures, $C_1$ and $C_2$ at a given point on the interior surface of the mold:

$$C=(C_1+C_2)/2$$

where $C_1$ and $C_2$ are the inverses of the principle radii of curvature, $R_1$ and $R_2$ measured on the interior surface of the cavity, i.e., radii of curvature of orthogonal circles (e.g., in the XZ and YZ planes) giving the same tangent as the interior surface of the mold at the point of interest.

$$C_1=1/R_1$$

$$C_2=1/R_2$$

The convention used here to fix the sign of the curvature is as follows. $C_1$ is taken as a positive number when the center (or origin) of its corresponding radius of curvature, $R_1$, lies on the same side as the interior of the mold. Similarly $C_2$ is taken as positive when the center of its corresponding radius of curvature, $R_2$, lies on the same side as the interior of the mold. When the centers of both principle radii of curvature lie in a direction towards the interior side of the mold the region is said to be concave towards the inside of the mold. Conversely, when the centers of both principle radii of curvature lie in a direction towards the exterior or outside of the mold, the region is said to be concave towards the exterior or outside of the mold.

Thus, a mold having a bump or dome portion in one or more of its walls that is concave toward the interior of the mold, for example in order to facilitate removal of the article from the mold, such as that depicted as features 27 and 28 in FIG. 6 of U.S. Pat. No. 3,149,188 has a positive curvature because the centers of both the principle radii of curvature lie inside the mold. Thus, a wall having this geometry after the composition has solidified to its steady state would not satisfy the criteria of a stress-releasing-element as set forth herein because a region of higher curvature is surrounded by a region of lower curvature.

In contrast, a depression or dimple concave towards the exterior of the mold has a negative curvature, since the centers of both the principle radii of curvature lie outside the mold. Such a depression surrounded by a region of either positive curvature (i.e., with centers lying on the interior side of the mold wall) or a region of zero curvature (e.g., planar or saddle shaped) would satisfy the geometric criteria for a stress-releasing-element as set forth herein.

The geometry of the lower curvature region of the stress-releasing-element can take a variety of forms depending upon the aesthetic properties desired. It can for example, be highly symmetric, e.g., circular or elliptical, or less symmetrical, e.g., egg-shaped. Furthermore this region can be distinctly curved or sensibly flat.

In several preferred embodiments of the invention discussed in Examples 1–4 and Example 9–10, the region of lower curvature bears a concentric relationship and is completely surrounded by the region of higher curvature. Example 11 illustrates a region having non-concentric boundaries.

Without wishing to be bound by theory, it is believed that the stress-releasing-element reduces or eliminates defects caused by shrinkage of the thermal setting composition as it cools and sets in a capacity mold by deforming in a controlled manner to absorb the stress. In addition to eliminating surface defects the stress-releasing-element can provide an integral geometrical design feature to the article. It is also believed that having a region of lower curvature surrounded by a region of higher curvature more efficiently transfers the stress so as to avoid wrinkling.

The level of deformation required in the stress-releasing-element depends on the coefficient of thermal contraction of the thermal setting composition employed. As discussed below this coefficient depends in turn on the detailed composition employed. The level of deformation also depends on the temperature differential during the casting process, e.g., the difference between the final temperature and the temperature at which the molten composition is inserted into the mold. The higher the temperature differential, the greater is the shrinkage and the higher is the potential for defects during casting.

The volume swept out by contraction of the stress-releasing-element should approximately equal the decrease in volume of the thermal setting composition during cooling. However, the actual volume swept out in molding a particular composition does not need to equal to the maximum volume differential that can be potentially accommodated by the particular mold design. In this way the mold can be used for a range of compositions of different extents of shrinkage (e.g., aerated Vs non-aerated compositions).

Other features of the inventive mold will become clearer when several preferred embodiments are discussed below in connection with Examples 1–4 and 9.

Thermal Setting Compositions

The molds described above can be used in principle with many types of thermal setting composition. These include both aqueous and non-aqueous based composition. Aqueous based compositions are defined here as compositions that form a continuous aqueous phase in the molten state.

Aqueous compositions include aqueous mixtures incorporating a variety of structure forming entities appropriate for opaque, translucent or transparent composition. These include but are not limited to: coagels, surfactant gels of frozen liquid crystalline phases, networks of either crystalline or amorphous solids, emulsion droplets (e.g., liquid, gelled or solidified high internal phase emulsions), thermoreversible polymer gels (e.g., gelatin, agar shear gels), microbubbles, and combinations of these structure forming entities.

Non-aqueous systems are those that form in the molten state either a non aqueous solution or a dispersion having a non aqueous continuous phase. Potential solvents include hydrocarbon (e.g., mineral oil, microcrystalline wax) or ester based (e.g., mono, di and triglycerides) liquids or waxes; polyalkaline glycols (polyethylene glycols), fatty alcohols, fatty acids, and mixtures thereof. These nonaqueous systems can employ a variety of structure forming units including but not limited to: networks of crystalline or non crystalline solids, polymeric inverse associative thickeners, emulsion droplets (e.g., liquid, gelled or solidified high internal phase emulsions), gas (e.g., microbubbles) and combinations of these structure forming entities.

The thermosetting compositions can be designed for a variety of consumer applications including but not limited to personal care compositions such as skin cleansers, shampoos, moisturizers, deodorants, and home care compositions such as laundry, ware washing, and hard surface cleaning bars.

Aqueous based thermosetting compositions particularly useful in the present invention are those used to fabricate cleansing articles. These compositions include surfactants, and may also include as optional ingredients various structuring agents, fillers, adjuvants, benefit agents, and included phases ("inclusions"). Some useful materials are exemplified below.

Surfactants

Useful surfactants can include anionic, nonionic, amphoteric, and cationic surfactants, and blends thereof. Surfactants that are suitable for contact by humans are preferred.

The anionic surfactants which may be used may be aliphatic sulfonates, such as a primary alkane (e.g., $C_8$–$C_{22}$) sulfonate, primary alkane (e.g., $C_8$–$C_{22}$) disulfonate, $C_8$–$C_{22}$ alkene sulfonate, $C_8$–$C_{22}$ hydroxyalkane sulfonate and alkyl glyceryl ether sulfonate (AGS); and aromatic sulfonates such as alkyl benzene sulfonate.

The anionic surfactant may also be a sodium, potassium, ammonium or substituted ammonium alkyl sulfate (e.g., $C_{12}$–$C_{18}$ alkyl sulfate) or alkyl ether sulfate having 1–10 ethylene oxide units (including alkyl glyceryl ether sulfates). Ammonium and sodium lauryl sulfates and lauryl ether sulfates are preferred.

The anionic may also be alkyl sulfosuccinates (including mono- and dialkyl, e.g., $C_6$–$C_{22}$ sulfosuccinates), an alkyl ethoxy sulfosuccinate (1–5 ethylene oxide uniuts preferred); alkyl and acyl taurates, alkyl and acyl sarcosinates, sulfoacetates, $C_8$–$C_{22}$ alkyl phosphates and phosphonates, alkyl phosphate esters and alkoxyl alkyl phosphate esters, acyl lactates, $C_8$–$C_{22}$ monoalkyl succinates and maleates, sulphoacetates, alkyl glucosides and acyl isethionates, and the like.

Monovalent and divalent salts of $C_8$–$C_{18}$ acyl isethionates are particulalrly useful anionic surfactants. The acyl isethionate may also be alkoxylated isethionate such as is described in Ilardi et al., U.S. Pat. No. 5,393,466, titled "Fatty Acid Esters of Polyalkoxylated isethonic acid; issued Feb. 28, 1995; hereby incorporated by reference. A particulalry suitable acyl isethionate is sodium cocoyl isethionate.

Soap is another useful anionic surfactant. The term "soap" is used in its popular sense, i.e., a salt of a long chain aliphatic alkane or alkene monocarboxylic acid. Sodium, potassium, mono-, di- and triethanol ammonium cations, or combinations thereof, are suitable for purposes of the invention. Generally, sodium, potassium, ammonium and triethanolammonium salts and their mixtures are used. Soaps useful herein are the well known alkali metal salts of natural or synthetic aliphatic (alkanoic or alkenoic) acids having 13 to 22 carbons, preferably 12 to 18. They may be described as alkali metal carboxylates of acrylic hydrocarbons having about 12 to 22 carbons. Especially suitable are $C_{12}$ to $C_{18}$ fatty acid soaps derived from plant or animal based triglycerides. Examples include tallow, palm stearin, palm oil, and coconut oil derived fatty acids.

One or more amphoteric surfactants may be included in the thermosetting composition of the invention. Such surfactants include at least one acid group. This may be a carboxylic or a sulphonic acid group. They include quaternary nitrogen and therefore are quaternary amido acids. They should generally include an alkyl or alkenyl group of 7 to 18 carbon atoms. Suitable amphoteric surfactants include simple betaines, amido betaines, sulphobetaines, and amphoacetates.

Cocamidopropyl betaine and cocoamidopropyl hydroxy sultaine are examples of useful amphoteric surfactants.

One or more nonionic surfactants may also be used in the toilet bar of the present invention. One class of nonionic surfactant is the reaction products of compounds having a hydrophobic group and a reactive hydrogen atom, for example aliphatic alcohols, acids, amides or alkylphenols with alkylene oxides, especially ethylene oxide either alone or with propylene oxide. Examples include alkyl ($C_6$–$C_{22}$) phenol ethylene oxide condensates, ($C_8$–$C_{18}$) primary or secondary linear or branched alcohol ethoxylates, and products made by condensation of ethylene oxide with the reaction products of propylene oxide and ethylenediamine. Other so-called nonionic detergent compounds include long chain (fatty) tertiary amine oxides, long chain tertiary phosphine oxides, dialkyl sulphoxide, and the like.

Other potential nonionic surfactants include: polysaccharide amides, alkyl polyglycosides, fatty acid esters of sorbitol or glycerol and mixtures thereof.

Generally the nonionic surfactant is present at less than about 10% by weight of the total amount of surfactant used.

One or more cationic surfactants may also be incorporated in the thermosetting composition. Examples of cationic surfactants are the quaternary ammonium compounds such as alkyldimethylammonium halogenides.

Other suitable surfactants which may be used are described in U.S. Pat. No. 3,723,325 to Parran Jr. titled "Detergent Compositions Containing Particle Deposition Enhancing Agents" issued Mar., 27, 1973; and "Surface Active Agents and Detergents" (Vol. I & II) by Schwartz, Perry & Berch, both of which are also incorporated into the subject application by reference.

Structuring Agents

Structuring of the thermal setting composition is often provided by the surfactants themselves. For example, interlocking networks of macroscopic crystals of soap may provide the structure. Such compositions are described in U.S. Pat. No. 5,340,492 to Kacher et al issued Aug. 23, 1994, and in U.S. Pat. No. 6,363,567 to Nadakatti et al issued Apr. 2, 2002.

Another example of surfactant structured thermosetting compositions are the well know transparent bars which may employ either soap or synthetic surfactants or their combination. Structuring may be provided by coagels formed by networks of nano-crystals or frozen liquid crystalline domains or by an isotropic liquid crystalline phase, e.g., cubic or gel phases. Nonlimiting examples of such compositions are described in U.S. Pat. No. 4,988,453 to Chambers et al issued Jan. 29, 1991 and U.S. Pat. No. 5,310,485 to Hill et al issued May 10, 1994.

However, in some circumstances additional structuring agents prove useful and can be employed in the invention at levels between about 0.5% to 60% by weight, preferably about 1% to about 35% by weight. Such structurants include saturated, ($C_8$–$C_{18}$) fatty acid or ester derivatives thereof, substituted fatty acids, long chain, preferably straight and; and/or branched long chain, saturated, ($C_{13}$–$C_{24}$) alkyl alcohol, or $C_{19}$–$C_{24}$ alkenyl-alcohol or mixtures thereof. Nonlimiting examples include stearic acid, 12-hydroxystearic acid, cetostearyl alcohol. Non-limiting examples of the effective use of such structurants in thermosetting compositions are disclosed in U.S. Pat. No. 6,458,751 to Abbas et al issued Oct. 1, 2002.

Mixtures of long chain fatty amines with anionic surfactants alone or admixed with fatty acid or fatty alcohol can also be employed as structurants.

Another class of useful structuring agents is thermosetting polymers, i.e., polymers that form thermoreversible gels having a specific melting or gelling temperature. These polymers are particularly useful in the formulation of thermosetting compositions that form elastic semisolids. Non-limiting examples of useful polymers that form thermoreversible gels include gelatin, carrageenan, agar, and gellan.

The incorporation of agents that provide some structure to the composition while it is still in the molten state is often very useful in the formulation of compositions that incorporate multiple phases. Such structurants are useful suspending agents to prevent segregation of the suspended phase before the composition sets. Example of suitable structuring agents for gas bubbles are the PEG alkyl ester and PEG alkyl ethers such as PEG (12) monolaurate. Examples of thermosetting compositions utilizing such suspending agents for highly aerated bars are described in U.S. Pat. No. 5,972,860 to Eshita et al Issued Oct. 26, 1999 and incorporated by reference herein.

Examples of other suitable structurants for suspension of for example, particulate inclusions in thermosetting melts are synthetic or natural hectorites. A synthetic hectorite, LAPONITE XLG from Laporte is particularly suitable. Examples of thermosetting compositions utilizing such suspending agents for suspending articles such as microcapsules in thermosetting compositions is disclosed in U.S. Pat. No. 6,403,543 to Edmund George issued Jun. 11, 2002. Kaolins, montmorilonites and other clays as well as silicas, and silica gels, can also be utilized as structurants.

Other inorganic compounds especially salts that form networks can also be utilized as structurants. Non-limiting examples include various phosphates, carbonates, aluminates, known in the art to form networks, mixtures thereof and the like.

Other structuring aids can also be selected from water soluble polymers chemically modified with a hydrophobic moiety or moieties, for example, EO-PO block copolymer, hydrophobically modified PEG such as POE(200)-glyceryl-stearate, glucam DOE 120 (PEG 120 Methyl Glucose Dioleate), and Hodag CSA-102 (PEG-150 stearate), and Rewoderm® (PEG modified glyceryl cocoate, palmate or tallowate) from Rewo Chemicals. Other structuring aids which may be used include Amerchol Polymer HM 1500 (Nonoxynyl Hydroxyethyl Cellulose) and hydroxypropyl starch phosphate sold by National Starch and Chemicals.

The composition optionally can contain fillers selected from inorganic minerals such as calcium sulfate, and the like; and starches, preferably water soluble starches such as maltodextrin and the like and polyethylene wax or paraffin wax, and the like. Fillers may be present in the composition in the range of 1 to 15% by weight, preferably 1 to 10% by weight.

Adjuvants

A wide variety of optional ingredients can be incorporated in the thermosetting composition of the invention. These include but are not limited to: perfumes; pearlizing and opacifying agents such as higher fatty acids and alcohols, ethoxylated fatty acids, solid esters, nacreous "interference pigments" such as $TiO_2$ coated micas; dyes and pigments; sensates such as menthol and ginger; preservatives such as dimethyloldimethylhydantoin (Glydant XL1000), parabens, sorbic acid and the like; anti-oxidants such as, for example, butylated hydroxytoluene (BHT); chelating agents such as salts of ethylene diamine tetra acetic acid (EDTA) and trisodium etridronate; emulsion stabilizers; auxiliary thickeners; buffering agents; and mixtures thereof.

One of the potential benefits provided by some of the compositions of the present invention is fragrance delivery especially to the skin and hair. To take maximum advantage of this benefit it is useful to employ the Type 2 and/or Type 3 perfume molecules as classified by Yang et al in U.S. Pat. No. 6,806,249 and incorporated by reference herein.

Benefit Agents

A particular class of optional ingredients highlighted here is benefit agents included to promote skin and hair health and condition. Potential benefit agents include but are not limited to: lipids such as cholesterol, ceramides, and pseudoceramides; humectants and hydrophilic skin conditioning agents such as glycerol, sorbitol, propylene glycol, and polyalkalene oxides polymers and resins; antimicrobial agents such as TRICLOSAN; sunscreens such as cinnamates; exfoliant particles such as polyethylene beads, walnut shells, apricot seeds, flower petals and seeds, and inorganics such as silica, and pumice; additional emollients (skin softening agents) such as long chain alcohols and waxes like lanolin; additional moisturizers; skin-toning agents; skin nutrients such as vitamins like Vitamin C, D and E and essential oils like bergamot, *citrus unshiu, calamus*, and the like; water soluble or insoluble extracts of avocado, grape, grapeseed, myrrh, cucumber, watercress, *calendula*, elder flower, *geranium*, linden blossom, amaranth, seaweed, *gingko, ginseng*, carrot; *impatiens balsamina*, camu camu alpina leaf and other plant exrtracts, and mixtures thereof.

The foamable composition can also include a variety of other active ingredients that provide additional skin (including scalp) benefits. Examples include anti-acne agents such as salicylic and resorcinol; sulfur-containing D and L amino acids and their derivatives and salts, particularly their N-acetyl derivatives; anti-wrinkle, anti-skin atrophy and skin repair actives such as vitamins (e.g., A,E and K), vitamin alkyl esters, minerals, magnesium, calcium, copper, zinc and other metallic components; retinoic acid and esters and derivatives such as retinal and retinol, vitamin B 3 compounds, alpha hydroxy acids, beta hydroxy acids, e.g. salicylic acid and derivatives thereof; skin soothing agents such as aloe vera, jahoba oil, propionic and acetic acid derivatives, fenamic acid derivatives; artificial tanning agents such as dihydroxyacetone; tyrosine; tyrosine esters such as ethyl tyrosinate and glucose tyrosinate; skin lightening agents such as aloe extract and niacinamide, alpha-glyceryl-L-ascorbic acid, aminotyroxine, ammonium lactate, glycolic acid, hydroquinone, 4 hydroxyanisole, sebum stimulation agents such as bryonolic acid, dehydroepiandrosterone (DHEA) and orizano; sebum inhibitors such as aluminum hydroxy chloride, corticosteroids, dehydroacetic acid and its salts, dichlorophenyl imidazoldioxolan (available from Elubiol); anti-oxidant effects, protease inhibition; skin tightening agents such as terpolymers of vinylpyrrolidone, (meth)acrylic acid and a hydrophobic monomer comprised of long chain alkyl (meth)acrylates; anti-itch agents such as hydrocortisone, methdilizine and trimeprazine hair growth inhibition; 5-alpha reductase inhibitors; agents that enhance desquamation; anti-glycation agents; anti-dandruf agents such as zinc pyridinethione; hair growth promoters such as finasteride, minoxidil, vitamin D analogues and retinoic acid and mixtures thereof.

Included Phases

The molds of the invention are especially useful for casting thermal setting compositions that experience a relatively greater level of shrinkage than ordinary "melt and pour" aqueous soap formulations. This situation can arise for example, when the thermal setting composition requires a higher temperature to achieve an adequate level of fluidity in order to be poured or injected into the mold. Examples of such compositions include opaque soap, soap-syndet and syndet compositions that contain appreciable levels of macroscopic crystalline solids and form viscous liquid crystal phases (e.g., lamellar or hexagonal phases) that endure to temperatures in excess of 70° C.

A second type of composition wherein the use of the inventive mold is useful is a composition that contains appreciable levels of one or more included components as a separately dispersed phase that has a relatively higher thermal coefficient of volume expansion than water that are present. For example a 50° C. change in temperature (e.g., 75° C. to 25° C.) produces approximately a 0.5% contraction in the volume of pure water ($\beta \sim 6.4 \times 10^{-4}$). The same 50° C. temperature change produces a 3.2% shrinkage in the volume of mineral oil ($\beta \sim 2.1 \times 10^{4}$) and an approximately 30% shrinkage in the volume of air neglecting changes in pressure. Thus, compositions containing appreciable levels of dispersed oil droplets such as moisturizing compositions and compositions containing appreciable levels of air or other gas such as aerated cleansing soap are more susceptible to shrinkage and thus derive greater benefit from the use of the molds of the instant invention.

Examples of useful thermosetting compositions containing appreciable levels of dispersed oil are described in U.S. Pat. No. 6,680,285 to Abbas et al issued Jan. 20, 2004 and U.S. Pat. No. 5,916,856 to Massaro et al issued Jun. 29, 1999 both incorporated by reference herein.

Examples of useful highly aerated thermosetting compositions are given in U.S. Pat. No. 5,972,860 already cited. Other examples of aerated thermosetting compositions are disclosed in U.S. Pat. No. 5,194,172 to Taneri et al issued Mar. 16, 1993. Both of these references teach the pouring of the composition into frames (open molds, e.g. rectangular frames or cups). In contrast the inventive molds of the instant invention permit direct casting of such compositions into a pack that can be sold without further handling and packaging.

The inventive article can also include a fibrous layer, network or component such as one composed of a pleated woven or non-woven material either completely or partially engulfed by the thermosetting composition. The fibrous material can be a continuous fiber network or fibrous assembly containing a large number of fiber to fiber bonds. Alternatively, the fibrous component can be a collection of individual fibers or discrete elements may be partially entangled such as is described in U.S. Patent Publication 2004/0033915 to Aleles et al published Feb. 19, 2004.

One method of forming composite articles is to inject the melt into a mold that already contains the fibrous layer. Although it is desirable to displace all the gas (air) within the fibrous layer with the molten thermosetting composition during filling and before sealing, this is not always possible. The shrinkage of the residual gas during solidification can lead to significant stress on the surface of the mold, which produces dents or wrinkles when conventional capacity molds are employed. However the use of the instant molds obviates this problem and can be employed in such applications. This approach has advantages in the production of buoyant compositions, e.g. floating soap, because the thermosetting composition does not require aeration, which can be complicated, and lead inhomogeneous compositions in may cases.

Systems

One useful and in many cases preferred embodiment of the invention is an integrated mold and thermosetting composition which essentially can be sold as a consumer product with limited further handling. In this case the mold also serves as the package.

For such applications the mold can be manufactured separately by for example, blow molding or thermoforming. The mold can be constructed in sections that are immediately sealed or subsequently sealed. Sealing can utilize heat, pressure, adhesives or a combination thereof. Alternatively the mold may be of a unitary design which is particularly suitable to manufacture by blow-molding.

The mold so formed is subsequently filled with the molten composition in a separate process that can be partially or fully automated, e.g., in a filling line. The mold can also be filled by hand in small scale manufacturing operations. In high speed processing and in the processing of viscous melts, the filling is done with a low pressure liquids filling apparatus, for example a syringe pump. Once the mold is filled it is sealed either by crimping, heat-sealing or with a separately attached plug/stopper.

Alternatively, the manufacture of the mold can be integrated with the filling process. Example of such an integrated process is described in U.S. Pat. No. 5,669,208 issued to Tabaroni et al on Sep. 23, 1997, and in WO 94/08852 to Tabaroni et al published Apr. 28, 1994. An example of integrated equipment suitable for manufacture of the systems described herein is the UNIFILL TF01 FORM-FILL-SEAL MACHINE sold by Elopak, Inc located in New Hudson, Mich.

The system so formed can incorporate additional features that increase its utility. For example, in can incorporate a hole or hook to allow it to be hung on a peg-board at the point of purchase.

One or more drain holes (covered with tape or foil that can be conveniently removed by consumers) and/or elevating "feet" can be incorporated into the mold. These features allow the mold to also be used as a storage container for the composition. This dual use is very convenient for compositions designed for cleansing operations because such solids can become messy to handle between uses. Drain holes should be added after bar solidifies because the mold needs to be airtight during cooling to ensure shrinkage is directed to stress-relieving-element. Otherwise, air will be sucked in and cavities will form in bar. The holes can be cut in the container plastic The mold can be made of opaque, translucent or transparent plastic or a combination of these. For example the mold can incorporate a transparent wall or window to allow consumers to see all or a portion of the composition. This is particularly useful for thermosetting compositions that are translucent or transparent, or are multiphase, multicolored or have other unique visible features such as inclusions or fibrous layers. Polymeric mold films can additionally be pre-printed prior to thermoforming. This eliminates the need for secondary packaging and lowers the cost to the purchaser. This is only possible due to the invention since the final shape with the invention is uniform from one article to another and the print set-up can thereby be pre-determined.

In addition, the mold/composition system can be put into further packaging such as a carton, blister pack, flow wrap, plastic wrapper with or without stiffener. Such outer packaging can again be opaque, transparent, translucent or packaging combining two or more different optical characteristics.

One of the advantages of the current inventive mold is in reducing the sealing strength required in using multi-part packages for compositions that experience significant shrinkage. Such compositions may require molds that expand slightly under low pressure to a shape that may have a significantly greater volume than the equilibrium or final shape, i.e., the shape reached after the composition cools and equilibrates. By making the expanding wall out of a more flexible material than the remaining wall or walls, the filling pressure required to expand the mold is significantly less than would otherwise be possible. This in turns allows a lower strength bond between the mold parts and allows the parts to be pried apart more easily without requiring pliers—a distinct advantage for consumers with small hands!

Films can also be used with a thickness gradient so that a stress-releasing-area is formed during the thermoforming process due to this thickness gradient. An example would be a film that is thinner in the center of the film and has a thickness gradient out to both edges.

EXAMPLES

Example 1–4 and Comparative 1–4

Molds

Figure 1:
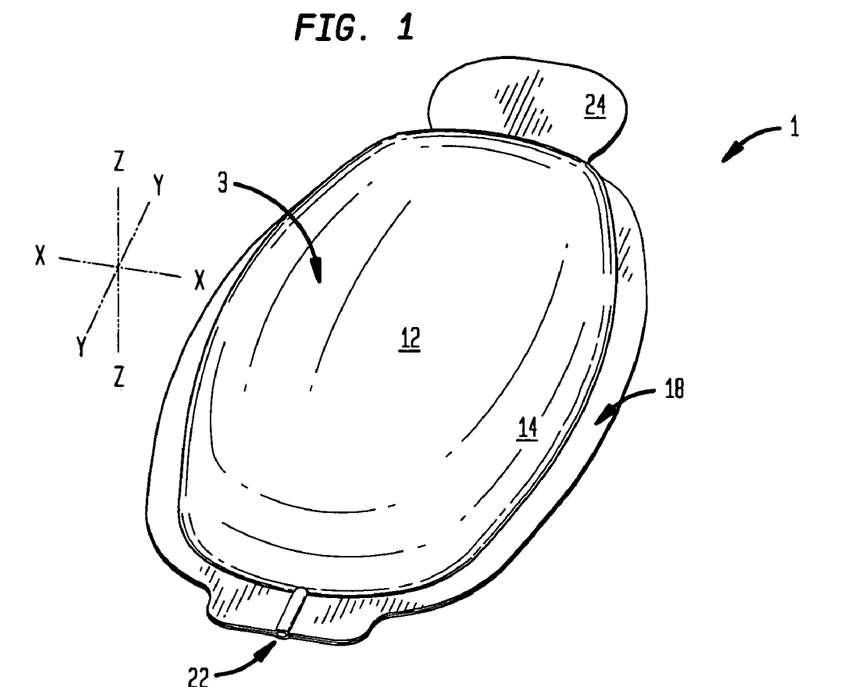
FIG. 1 is a perspective view showing the top wall of the mold used in examples 1–4.
Figure 2:
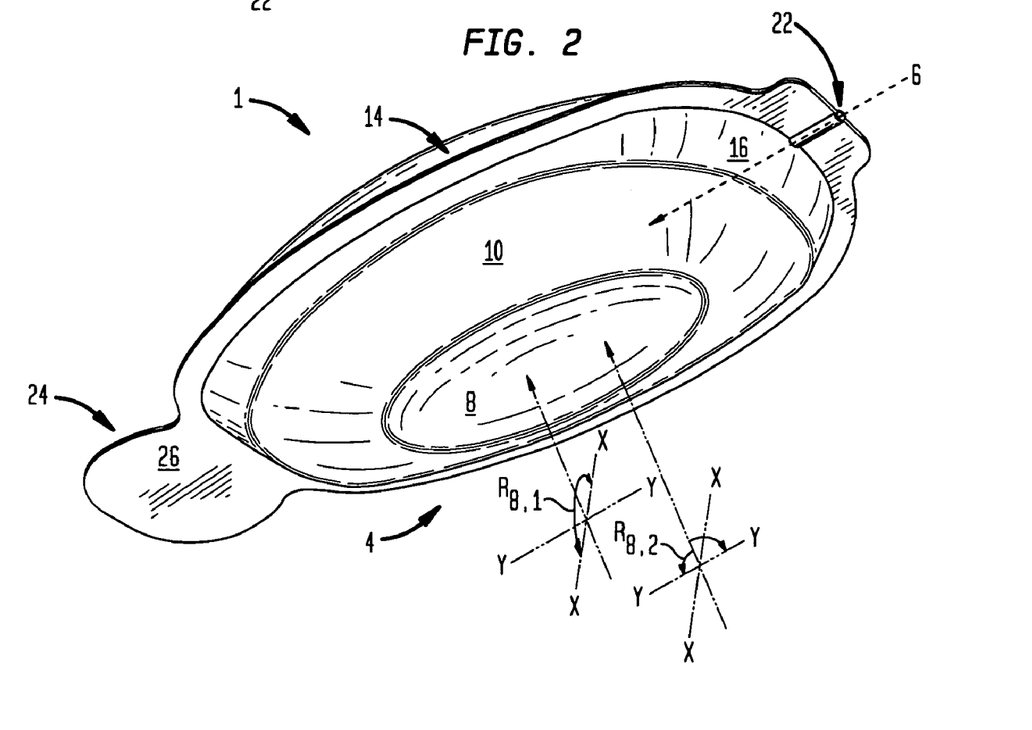
FIG. 2 is a perspective view showing the bottom wall of the mold used in examples 1–4.
Figure 3:
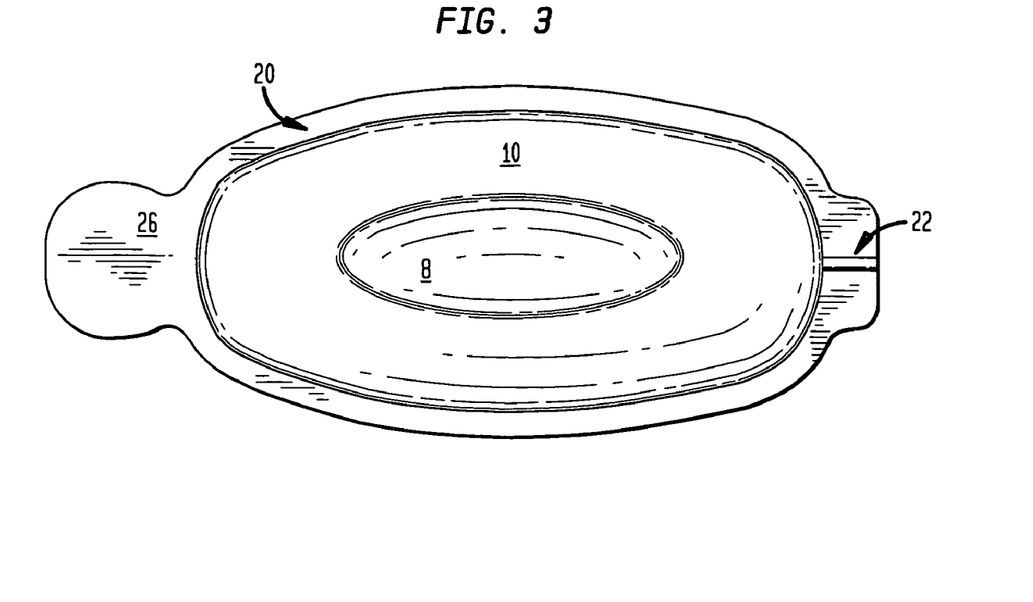
FIG. 3 is a plan view showing the bottom wall of the mold used in examples 1–4.

For Examples 1–4 identical plastic molds depicted schematically in FIG. 1–FIG. 3 were constructed. The mold 1 included a top wall 3 and a bottom wall 4 which when joined (e.g., by press fitting, heat sealing or an adhesive coating) defines an interior space or cavity 6. The cavity is approximately 10 cm long (Y direction), 5 cm in width (X direction), and 3.8 cm in thickness (Z direction) respectively. The top Wall 3 was comprised of a polymer that had a thickness of about 400 microns while bottom wall 4 was comprised of a polymer that had a thickness of 300 microns.

Bottom wall 4 included an inner region 8 surrounded in a concentric fashion by a surrounding region 10. Inner region 8, which is elliptical, has a major axis of approximately 5.8 cm (Y direction) and a minor axis of approximately 2.1 cm (X direction). Inner region 8 is concave toward the exterior of the mold and according to the convention set forth above, the curvature of the inner region 8 is taken as negative since as shown in FIG. 2, both its principle radii of curvature, R8,1 and R8,2 have their origin outside the mold. Surrounding region 10 is concave towards the interior of the mold and by convention has a positive curvature since both its principle radii of curvature (not shown) have their origin in the direction of the interior of the mold. Thus, the inner region 8 has a lower curvature, i.e., less positive, than surrounding region 10. The inner region 8 and the surrounding region 10 together comprise the stress-releasing-element.

The curved surfaces 12 of the top wall 3 adjoins a top wall band 14 and the curved surrounding region 10 of the bottom wall 4 adjoins a bottom wall bands 16. The top wall band 14 adjoins a top wall sealing strip 18 and the bottom wall band 16 adjoins a bottom wall sealing strip 20 (See FIG. 3) The top wall sealing strip 18 and bottom wall sealing strip 20 were heat sealed prior to filling the mold with the thermosetting composition described below.

The mold 1 was filled via a filling channel 22 that accepted a cylindrical nozzle coupled to a syringe or other form of filling pump (a syringe was used in the examples and comparatives discussed below).

The top and bottom sealing strips 18 and 20 were continuous with planar top and bottom pull tabs 24 and 26 that were located on one side of each wall opposite from the filling channel 22. These pull tabs 24 and 26 were congruent when the mold 1 was sealed. However, the pull taps were not completely heat sealed and served as a prying means to open the filled mold.

Figure 4:
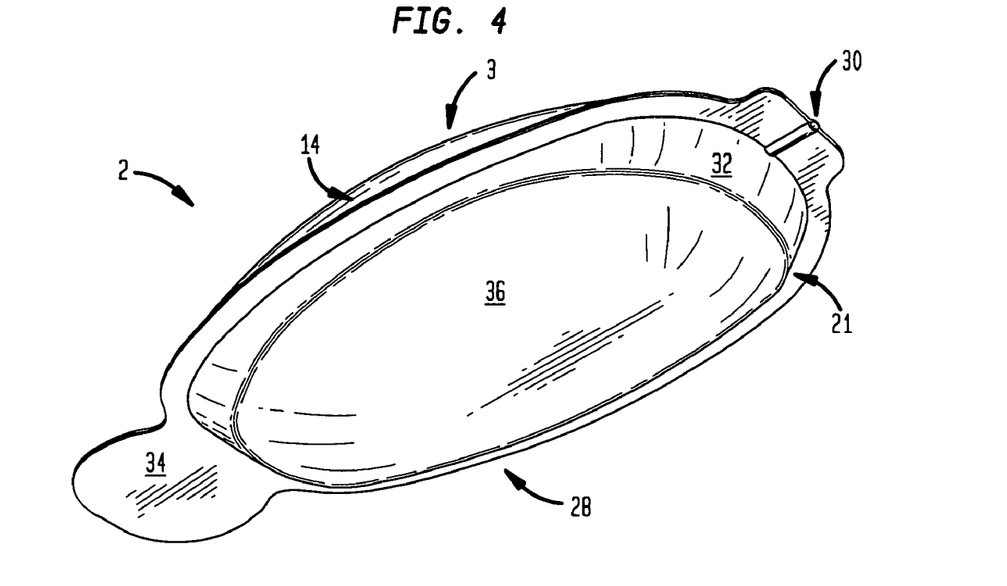
FIG. 4 is a perspective view showing the bottom wall of the mold used in comparatives 1–4.

For Comparatives 1–4, a conventional plastic mold depicted schematically in FIG. 1 (top wall) and FIG. 4 (bottom wall 28) was employed. This comparative mold 2 had the same top wall 3 as used in the experimental mold (FIG. 1) but had a different bottom wall 28. The comparative mold was similar in overall geometry and dimensions to the exemplary mold and included a filling channel 30, top and bottom wall bands 14 and 32, top and bottom sealing strips 18 and 21, adjoining top and bottom pull tabs 24 and 34.

The comparative Mold 2 differed in two key respects from exemplary mold 1. First, the top wall 3 and the bottom wall 28 had an identical thickness of 400 microns. Secondly, as can be seen from FIG. 4, the central curved region 36 of the bottom wall 28 was composed of a single geometrical region of positive curvature (concave towards the interior of the mold). Thus, the comparative mold 2 did not contain a central distinct geometrical region of lower curvature surrounded by a region of higher curvature as did the bottom wall 4 of the exemplary mold 1 (i.e., regions 8 and 10).

The walls of the molds used for Examples 1–4 (FIG. 1, FIG. 2 and FIG. 3) and the molds used for Comparatives 1–4 (FIG. 1 and FIG. 4) were made of the same plastic material which was either a polystyrene/polyethylene laminate or a polystyrene/ethylenevinyl alcohol copolymer/polyethylene laminate. The polymer films were obtained from Cobelplast RPC, Belgium. It is noted that this composition includes substantial emulsified oil (¼ by weight).

The exemplary and comparative molds were made by a thermoforming process.

Thermal Setting Composition

The thermal setting composition is described in Table 1. It is skin cleansing composition in the ultimate form of a bar.

TABLE 1

Thermal setting composition used in Examples 1–4 and Comparatives 1–4

| INGREDIENTS | WEIGHT % |
|---|---|
| Lauryl Alcohol | 5.00 |
| Glycerin | 4.00 |
| Cenwax A (12-Hydroxy stearic acid) | 13.00 |
| Sunflower Seed Oil | 23.9 |
| BHT | 0.01 |
| Propylene Glycol | 4.00 |
| EHDP | 0.03 |
| EDTA | 0.05 |
| Titanium Dioxide | 1.00 |
| Q-24087 (Perfume) | 0.81 |
| SLES (2EO) (70%) | 10.32 |
| Bio-Terge 90 (AOS) | 7.2 |
| Sodium cocoyl isethionate | 15.3 |
| Stearic acid | 14.7 |
| Water | to 100% |

The composition was prepared by melting all the ingredients together at about 92° C. in a stainless steel mixer fitted with an overhead stirrer. The composition is either cooled to 80° C. and used directly to fill the molds or is cooled to room temperature (solidified) and stored as a solid until it is remelted at 80° C. for filling.

EXPERIMENTAL CONDITIONS

The exemplary molds incorporating the stress-releasing-element were compared with the conventional type mold under four different test conditions:

Example 1 and Comparative 1

The molds were filled with 90 gm of the thermoset composition shown in Table 1 at a temperature of 80° C. under gravitational force. Molten material for filling the molds typically has a viscosity of 100–3000 cps as measured by a Brookfield viscometer. The top openings of the filled molds were then heat sealed. Finally, the filled molds were cooled to ambient temperature (about 25° C.) and the excess plastic (flashing) trimmed from the mold.

Example 2 and Comparative 2

The conditions were similar to those used for Example 1 and Comparative 1 described above except that the cooling step was carried out in a refrigerator.

Example 3 and Comparative 3

The conditions were similar to those described above for Example 1 and Comparative 1 except that the filled molds were cooled at ambient temperature to about 25° C. before they were sealed.

Example 4 and Comparative 4

The conditions were similar to those described above for Example 2 and Comparative 2 except that the filled molds were cooled in a refrigerator before they were sealed.

After the experimental treatments the filled molds were inspected visually for defects. The molds were then opened and the solidified compositions were removed and their surfaces visually inspected. The solidified bar was then cut into sections and the interior inspected for defects such as hole or bubbles.

The results, summarized in Table 2, demonstrate that the inventive mold which include a stress-releasing-element as set forth herein led to a much more esthetically acceptable package and article that was free of wrinkles, dents and interior defects (compare Example 1 and Example 2 with Comparative 1 and Comparative 2).

The results also demonstrate that the differences between using the inventive and conventional mold are most significant when the mold is sealed before the composition is cooled (compare Example 3 and Example 4 with Comparative 3 and Comparative 4). When the mold is allowed to remain open during cooling the change in volume arising from the shrinking composition is compensated by air which is sucked in through the open seal (the mold is in essence no longer a capacity mold in the sense used herein). Thus, the effect of the inventive mold is maximal when the mold is sealed before the composition is completely cooled. In fact, the hotter the composition is at the time the mold is seal, the greater will be the effect of the stress-releasing-element.

TABLE 2

Comparison of molds according to invention (Example 1–4 stress-releasing-element) with those of prior art (Comparatives 1–4 no 4 stress-releasing-element)

| | TEST CONDITIONS | RESULTS | | |
|---|---|---|---|---|
| | | FILLED MOLD | SURFACE OF BAR | INTERIOR OF BAR |
| Example 1 | Filled, sealed and cooled at ambient temperature | No dents | Uniform - few defects | Uniform no holes or pits |
| Comparative 1 | | Large dents or wrinkles in top wall 3 | Dented some pits | Mainly uniform few holes or pits |
| Example 2 | Filled, sealed and cooled in refrigerator | No dents | Uniform - few defects | Uniform no holes or pits |
| Comparative 2 | | Large wrinkle spanning top wall 3 | Irregular undulating top surface | Mainly uniform no holes or pits |
| Example 3 | Filled, cooled at ambient temperature, and sealed | No dents | Uniform - few defects sition near fill hole | Bubbles inside composition near fill hole |
| Comparative 3 | | Only minor dents if at all | Only minor dents if at all | Bubbles inside composition near fill hole |
| Example 4 | Filled, cooled in refrigerator, and sealed | No dents | Uniform - few defects | Bubbles inside composition near fill hole some cavities |
| Comparative 4 | | Only minor dents if at all | Only minor dents if at all | Bubbles inside composition near fill hole some cavities |

Example 5 and Comparative 5

The molds used for Example 5 is identical to that described for Example 1. The mold used for Comparative 5 had roughly the same geometry as the mold that was used for Comparatives 1–4 and described above (see FIG. 1 and FIG. 4) but is constructed of rigid aluminum. The wall thickness was greater than 1 mm, which provides a mold that can both support at least a partial vacuum without deformation.

Thermal Setting Composition

The thermal setting composition and its preparation was the same as that used above and is given in Table 1.

Experimental Conditions

Both molds were filled with 90 gm of the thermoset composition shown in Table 1 at a temperature of 80° C. under gravitational force. Molten material for filling the molds typically has a viscosity of 100–3000 cps as measured by a Brookfield viscometer.

For the Example 5 mold, the top opening of the filled mold was heat sealed. The filled molds were cooled to ambient temperature (about 25° C.) and the excess plastic (flashing) trimmed from the mold.

The comparative 5 mold (rigid aluminum) was sealed with an airtight plug and cooled to ambient temperature.

Once the molds equilibrated at room temperature overnight they were opened and the solidified composition (a "bar") was removed. The bars were cut into two halves along a longitudinal center plane parallel to the faces and examined visually.

The bar formed in the rigid aluminum mold (Comparative 5) had one or hollow regions either in its interior or near the inlet. Apparently as the bar cools from its edges inward, stresses develop in the interior of the still molten mass. When this stress exceeds the work of cohesion of the mass, the mass disproportionates creating a void space within the solidified composition.

In contrast, the bar formed in the inventive mold (Example 5) is solid and uniform throughout. In this case the stress which is produced during shrinkage is transmitted to the more flexible "composite" wall yielding a bar that has a reproducible depression on one of its surfaces.

Examples 6–8 and Comparatives 6–8

Plastic molds identical to those used in Example 1 and Comparative 1 may be utilized. The respective molds may be filled with the compositions shown in Table 3 (in the molten state) at the filling temperatures indicated in the table heart sealed and cooled to room temperature. Composition A yields a transparent bar. Composition B yields an aerated bar while composition C yields a high oil containing bar.

Example 6–8

Molds in which these compositions are cast utilize the exemplary design of Example 1 (contains stress-relieving-element) are expected to be free of visible wrinkles, folds and defects. The bars should have a smooth surface without any extraneous dents, pits or other defects.

Comparative 6–8

In contrast, molds that do not contain the stress-releasing element should have distinctly visible wrinkles or folds. Furthermore, the bars that are cast in these molds should have a dented/pitted surface.

TABLE 3

Compositions for Examples 6–8 and Comparatives 6–8.

| INGREDIENTS | A | B | C |
|---|---|---|---|
| | Composition - Wt % | | |
| Sodium cocoyl isethionate | | 1 | 25 |
| PEG(12) monolaurate | | 2 | |
| Sodium $C_{12}$ Alpha olefin sulfonate | | | 9 |
| Sodium lauryl sulfate | 7.2 | | |
| Sodium lauryl ether sulfate (2EO) | | 1 | 9 |
| Cocoamidopropyl betaine | | | |
| Stearic acid/palmitic acid blend | 14 | | |
| Coconut fatty acid | 9 | | |
| 12 hydroxystearic acid | 3.5 | | |
| Lauric acid | 3.1 | 36.7 | |
| Sodium hydroxide | 2.34 | 7.14 | |
| Sorbitol | 14.5 | 3 | |
| Carbowax 200 (PEG) | 5.0 | | |
| Propylene glycol | 10.2 | | 7 |
| Isopropyl alcohol | 1.2 | | |
| Glycerin | | 17 | 7 |
| Stearic acid | | | 14 |
| Lauryl alcohol | | | 10 |
| Sunflower seed oil | | | 25 |
| Perfume and minors | 4.1 | 3 | 1.5 |
| Water | To 100% | To 100% | To 100% |
| Air | | 25% by volume | |
| Mold filling temperature (° C.) | 65 | 70 | 75 |

Example 9 and Comparative 9

Molds

Figure 5:
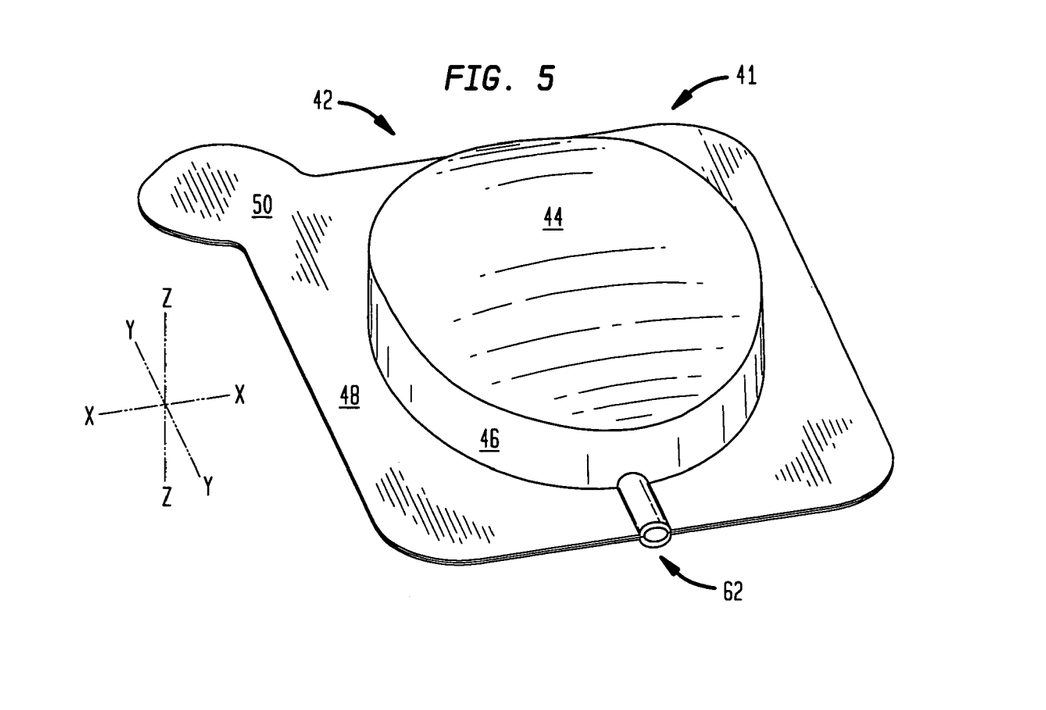
FIG. 5 is a perspective view showing the top wall of the mold used in example 9.
Figure 6:
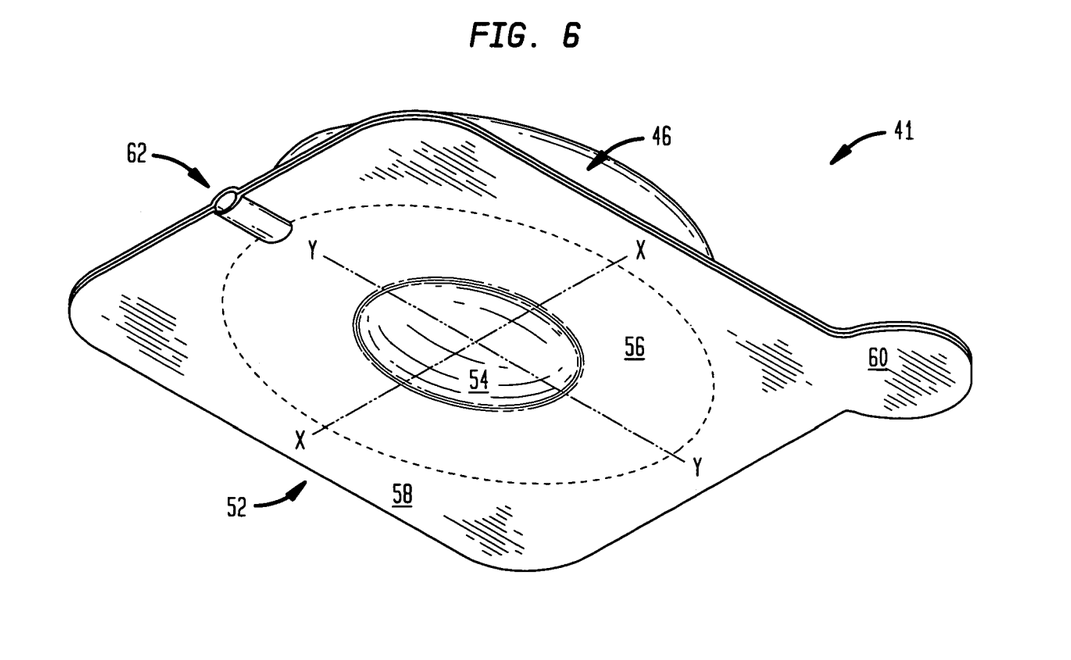
FIG. 6 is a perspective view showing the bottom wall of the mold used in example 9.
Figure 7:
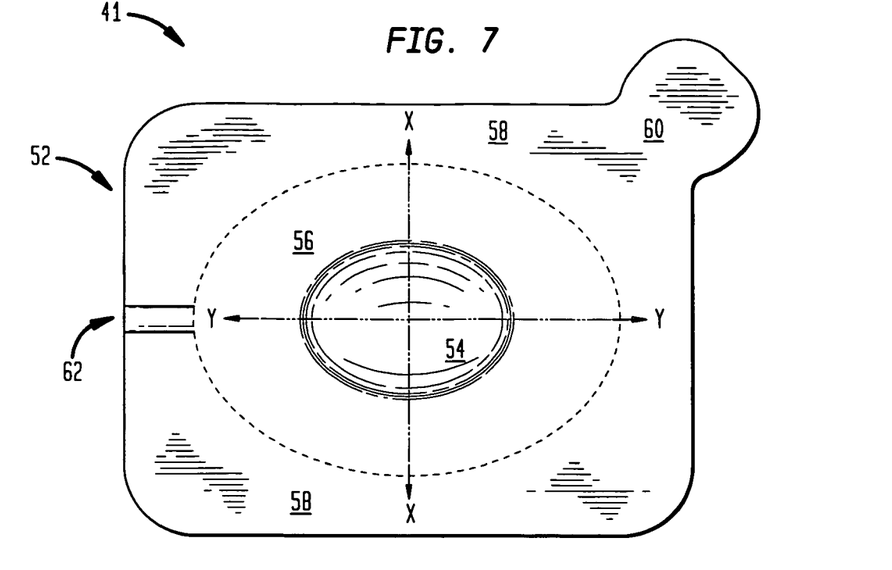
FIG. 7 is a plan view of the bottom wall of the mold used example 9

The experimental plastic mold 41 depicted schematically in FIG. 5, FIG. 6 and FIG. 7 is employed for Example 9. The mold 41 includes a top wall 42, best be seen in FIG. 5, which includes a central eliptical outwardly curved region 44 adjoining a top wall band 46. The top central region 44 can optionally be embossed with indicia and logos. The top wall band 46 adjoins a planar top wall sealing strip 48 which is continuous with a top wall pull tab 50. With reference to FIG. 6, the dimensions of the top wall 42 are approximately 13 cm in length (Y direction), 9 cm in width (X direction) and 4 cm in thickness (Z direction).

The top wall 42 is comprised of a polymer film nominally 450 microns in thickness. However, some parts of the top wall 42 are thicker than 450 microns (for example where the curved region 44 joins the band 46 and some parts are thinner than 450 micron. The polymer film of which the top wall 42 and the bottom wall 52 are composed is a three layer laminate comprised of polystyrene/ethylenevinyl alcohol copolymer/polyethylene. This polymer is known as A94 PL/R and is commercially available from the company Cobelplast RPC of Belgium. Different grades of this material may be either transparent or translucent.

The bottom wall 52 of mold 41 is depicted in FIG. 6 and FIG. 7 and includes a central elliptically shaped inner region 54 that is concave towards the exterior of the mold 41 and thus has a negative curvature by the convention employed herein. The inner region 54 is surrounded by a outer region 56, which in this example is planar and thus has a zero curvature, i.e., infinite radius of curvature. Thus, the bottom wall 52 includes a region of lower curvature 54 surrounded by a region of higher curvature 56. The outer boundary of the planar region 56 is depicted by dashed line of the same dimensions as the top wall band 46 because it is continuous with a planar bottom wall sealing strip 58. The bottom wall sealing strip 58 and a bottom wall pull tap 60 which in this case is located at a corner of mold 41. The bottom wall is fabricated from a 350 micron laminated polymer film with the central region 54 thinned to about 200–325 microns in thickness. Inner region 54 and outer region 56 together comprise the stress-releasing-element.

The laminated plastic material used to fabricate exemplary mold 41 allowed heat-sealed by applying heat and pressure to the sealing strips 48 and 58 before filling although a separate adhesive could have also been used. The exemplary mold 41 is filled by means of a nozzle (e.g., a syringe needle) inserted into the filling channel 62.

Figure 8:
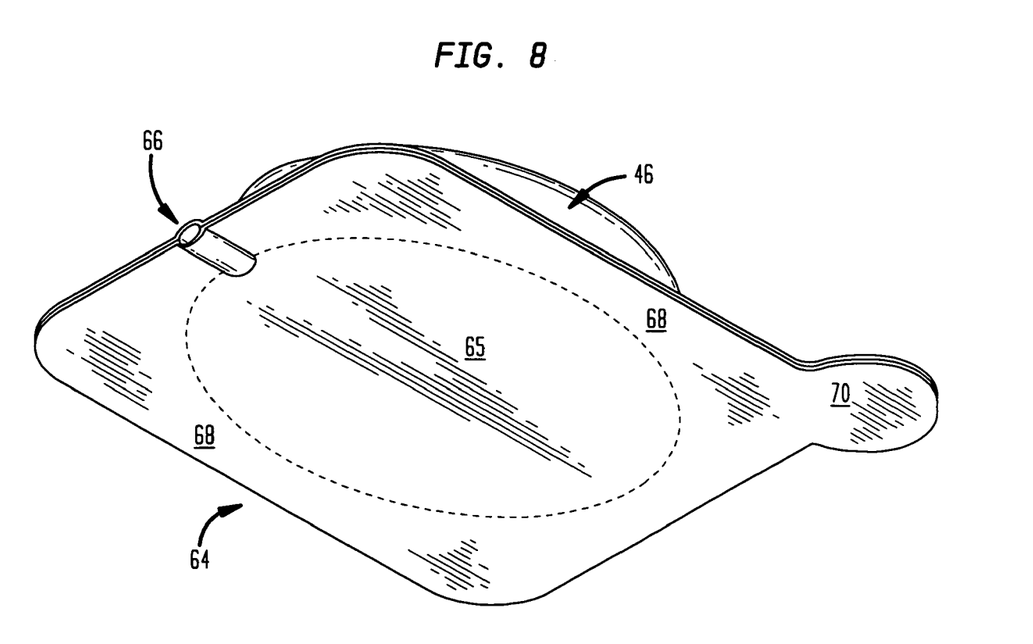
FIG. 8 is a perspective view showing the bottom wall of the mold used in comparative 9.

The conventional mold used in comparative 9 utilizes the same top wall 42, has the same overall dimensions and is composed of the same materials (laminated polymer film 450 micron in thickness) as is employed in the example 9 mold (FIG. 5) described above. However, the central region 65 of the bottom wall 64 of the comparative mold used in Comparative 9 is completely planar and does not include the inner region of lower curvature as is present in the exemplary mold (i.e., region 54). A second difference between the experimental and comparative molds is that the bottom wall 64 of the comparative mold is fabricated from a laminated polymer film of the same nominal thickness, i.e., 450 microns, as the top wall 42. As seen in FIG. 8, the bottom wall 64 of the comparative mold has other features in common with the bottom wall 52 used in the experimental mold (filling channel 66, bottom wall sealing strip 68, and bottom wall pull tab 70)

Both of the molds used for example 9 and comparative 9 have a capacity of about 85 to 87 cm³. However the experimental mold has a somewhat lower capacity because of the interior volume occupied by the dimpled region 54. The final volume of the experimental mold can be increased to the same volume by slightly adjusting the cavity shape, however.

Experimental Results

The Example 9 mold described above is completely filled with approximately 90 gm of a thermosetting liquid such as any one of the compositions shown in Table 1 and 3 (through the fill channel 62) at a temperature of 80° C. The mold is then sealed and cooled to room temperature either under ambient or refrigerated conditions. It is expected that the filled mold containing the solidified thermosetting composition is free of wrinkles, dents or other defects characteristic of local wall collapse. The solidified composition when removed from the mold faithfully reproduces the interior dimensions of the mold, should not have surface defects such as dents and is uniform throughout.

In contrast, the comparative mold, Comparative 9, when completely filled with the same composition as used in Example 9 under the same filling conditions i.e., 80° C. and cooled to solidify the composition is expected to become dented especially along the curved region 44 of the upper wall 42. The location, shape, number, and size of dents is variable and random along the top surface of the mold for identical molds filled via the same process. The solidified compositions should be dented in many different patterns so that none of the bars would be considered geometrically identical. These dented shapes would be judged aesthetically unattractive.

Example 10

Figure 9:
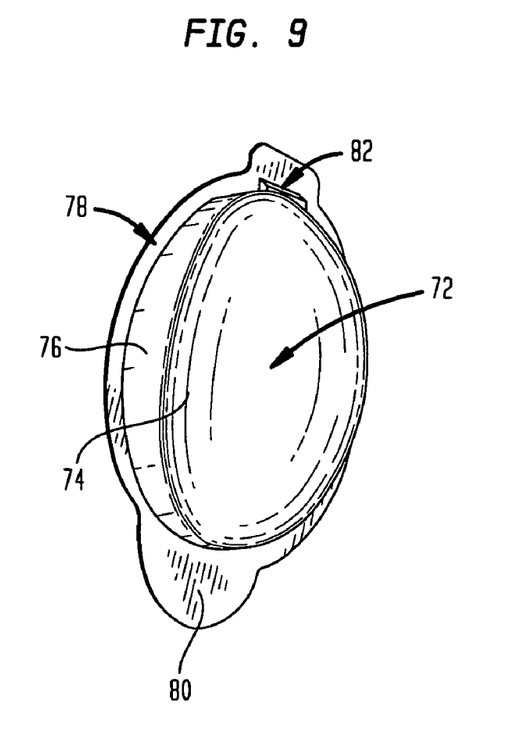
FIG. 9 is a perspective view showing the top wall of the mold used in Example 10.
Figure 10:
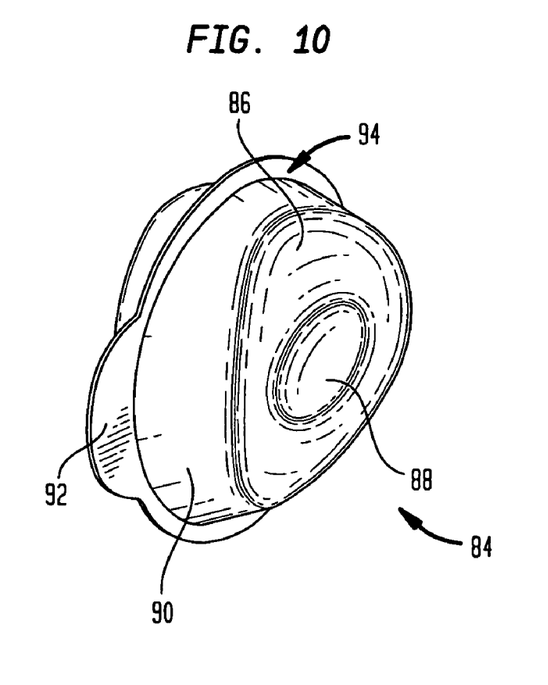
FIG. 10 is a perspective view showing the bottom wall of the mold used in Example 10.

Another embodiment of the mold of the invention is shown in FIG. 9 and FIG. 10. The top half 72, shown in FIG. 9, includes an outwardly curving top surface 74 adjoining a top wall band 76, a top sealing strip 78 integrated with a top pull tab 80 which is more triangular in shape than in previous designs discussed above. Opposite the top pull tab 80 is a filling channel 82.

The bottom half of the mold 84 is shown in FIG. 10. Adjoining a bottom side band 90 is a stress-releasing-element comprised of an outer region 86 surrounding an inwardly curving inner region 88. Region 86 and 88 are more elastic (thinner) than the remaining walls of the mold (72). The bottom mold half 84 also includes a sealing strip 94 and a triangular shaped pull tab 92 congruent with top pull tap 80.

Example 10

Figure 11:
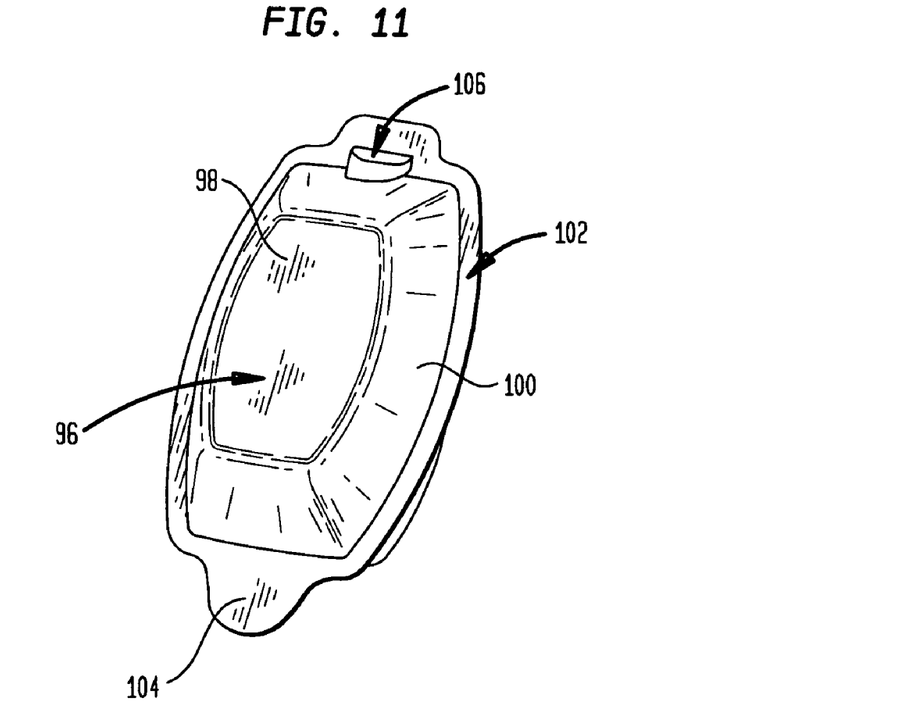
FIG. 11 is a perspective view showing the top wall of the mold used in Example 11.
Figure 12:
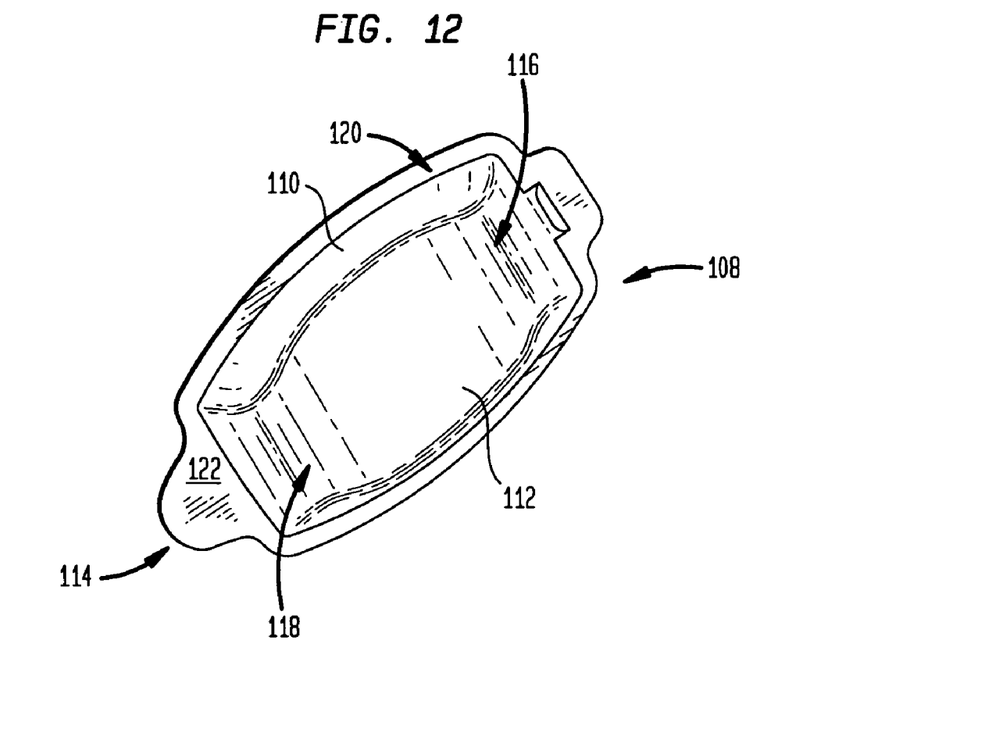
FIG. 12 is a perspective view showing the bottom wall of the mold used in Example 11.

Another embodiment of the mold of the invention is shown in FIG. 11 and FIG. 12. The top half 96, shown in FIG. 11, includes an almost flat top surface 98 adjoining a top wall band 100, a top sealing strip 102 integrated with a top pull tab Opposite the top pull tap 104 is a filling channel 106.

The bottom half of the mold 108 is shown in FIG. 12. Adjoining a bottom side band 110 is a stress-releasing-element comprised of outer region 116 and 118 partially surrounding (bounding) an inwardly curving saddle shaped inner region 112. Region 112 has a lower curvature than regions 116 and 118. The regions comprising the stress-releasing-element has a gradient of thickness with Region 112 being the thinnest and increasing in a direction towards the elevations 116 and 118. The bottom mold half 108 also includes a sealing strip 120 and a pull tap FIG. 2.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

The invention claimed is:

1. A mold for casting thermal setting compositions comprising a cavity bounded by a wall or walls; wherein at least one wall includes a stress-releasing-element comprising a region of lower curvature and an at least partially surrounding region of higher curvature and wherein the average flexibility, $F_{SRE(AVE)}$, of the lower curvature region and/or the surrounding higher curvature region comprising the stress-releasing-element, is greater than the average flexibility of remaining wall or remaining walls of the mold, $F_{RW(AVE)}$.

2. A mold according to claim 1 wherein the wall or walls comprise a polymer or copolymer selected from the group consisting of polycarbonate, polyethylene terephthalate (including atactic forms) and other polyesters, polyvinyl chloride, high density polyethylene, low density polyethylene, linear low density polyethylene, polypropylene, biaxially orientated polypropylene, ethylene-vinyl alcohol copolymers, ethylene vinylacetate copolymers, polystyrene, acrylic/styrene/butadiene copolymers and blends of these polymers and copolymers formed of their constituent monomers.

3. A mold according to claim 1 wherein the wall or walls is a laminated film comprising at least one polymer layer.

4. A mold according to claim 1 wherein a ratio of $F_{SRE(AVE)}$ to $F_{RW(AVE)}$ is greater than about 1.2.

5. A mold according to claim 1 wherein a ratio of $F_{SRE(AVE)}$ to $F_{RW(AVE)}$ is about 1.5 or or greater.

6. A mold according to claim 1 wherein the lower curvature region and/or the at least partially surrounding higher curvature region comprising the stress-releasing-element has an average thickness, $T_{SRE(AVE)}$ that is lower than the average thickness of the remaining wall or walls, $T_{RW(AVE)}$.

7. A mold according to claim 6 wherein a ratio of $T_{SRE(AVE)}$ to $T_{RW(AVE)}$ is less than about 0.92.

8. A mold according to claim 6 wherein a ratio of $T_{SRE(AVE)}$ to $T_{RW(AVE)}$ is about 0.75 or less.

9. A mold according to claim 1 wherein the average thickness of the remaining wall or walls is in the range of from about 100 microns to about 600 microns.

10. A mold according to claim 1 wherein the region of lower curvature is completely surrounded by the region of higher curvature.

11. A mold according to claim 10 wherein the region of lower curvature and the region of higher curvature are concentric.

12. A system comprising a mold containing a shaped thermal setting composition suitable for contact to skin; said mold comprising a cavity bounded by a wall or walls; wherein at least one wall includes a stress-releasing-element comprising a region of lower curvature and an at least partially surrounding region of higher curvature and wherein the average flexibility, $F_{SRE(AVE)}$, of the lower curvature region and/or the surrounding higher curvature region comprising the stress-releasing-element, is greater than the average flexibility of remaining wall or remaining walls of the mold, $F_{RW(AVE)}$; and wherein the mold serves as all or a part of a package for the shaped thermal setting composition at point of sale.

13. A system according to claim 12, wherein the shaped thermal setting composition is suitable for cleansing skin, hair, laundry, or hard surfaces.

14. A system according to claim 12 wherein the shaped thermal setting composition is an aqueous based composition comprising a surfactant selected from the group consisting of anionic, nonionic, amphoteric, and cationic surfactants and mixtures thereof.

15. A system according to claim 14 wherein the aqueous based composition has melting point or softening point of at least about 60° C.

16. A system according to claim 12 wherein the wall or walls of the mold is comprised of a polymer or copolymer selected from the group consisting of polycarbonate, polyethylene terephthalate (including atactic forms) and other polyesters, polyvinyl chloride, high density polyethylene, low density polyethylene, linear low density polyethylene, polypropylene, biaxially orientated polypropylene, ethylene-vinyl alcohol copolymers, ethylene vinylacetate copolymers, polystyrene, acrylic/styrene/butadiene copolymers and blends of these polymers and copolymers formed of their constituent monomers.

17. A system according to claim 12 wherein a ratio of $F_{SRE(AVE)}$ to $F_{RW(AVE)}$ is greater than about 1.2.

18. A system according to claim 12 wherein a ratio of $F_{SRE(AVE)}$ to $F_{RW(AVE)}$ is about 1.5 or greater.

19. A system according to claim 12 wherein the lower curvature region and/or the at least partially surrounding higher curvature region comprising the stress-releasing-element has an average thickness, $T_{SRE(AVE)}$ that is lower than the average thickness of the remaining wall or walls, $T_{RW(AVE)}$.

20. A system according to claim 19 wherein a ratio of $T_{SRE(AVE)}$ to $T_{RW(AVE)}$ is less than about 0.92.

21. A system according to claim 19 wherein a ratio of $T_{SRE(AVE)}$ to $T_{RW(AVE)}$ is about 0.75 or less.

22. A system according to claim 12 wherein the average thickness of the remaining wall or remaining walls is in the range of from about 100 microns to about 600 microns.

23. A system according to claim 12 wherein the thermosetting composition is an aqueous composition comprising a separate included non-aqueous phase selected from the group consisting of dispersed oil, dispersed gas, fibrous material, and mixtures thereof.

24. A system according to claim 12 wherein the thermosetting composition and/or the mold is/are translucent or transparent.

* * * * *